United States Patent [19]

Kragle

[11] Patent Number: 5,089,203
[45] Date of Patent: Feb. 18, 1992

[54] METHOD AND APPARATUS FOR FORMING AN OUTER SKIN ON HONEYCOMB STRUCTURES

[75] Inventor: Harry A. Kragle, Corning, N.Y.

[73] Assignee: Corning Incorporated, Corning, N.Y.

[21] Appl. No.: 653,941

[22] Filed: Feb. 12, 1991

[51] Int. Cl.⁵ .......................................... B29C 47/12
[52] U.S. Cl. ........................ 264/177.11; 264/177.12; 264/211.11; 425/197; 425/380; 425/461; 425/464; 425/466; 425/467
[58] Field of Search ..................... 264/177.11, 177.12, 264/211.11; 425/461, 466, 464, 380, 197, 198, 199, 467

[56] References Cited

U.S. PATENT DOCUMENTS

| | | | |
|---|---|---|---|
| 3,790,654 | 2/1974 | Bagley | 264/177.11 |
| 4,168,944 | 9/1979 | Morikawa et al. | 425/464 |
| 4,298,328 | 11/1981 | Frost | 425/466 |
| 4,333,896 | 6/1982 | Cunningham | 425/466 |
| 4,343,604 | 8/1982 | Minjolle | 425/464 |
| 4,349,329 | 9/1982 | Naito et al. | 425/461 |
| 4,381,912 | 5/1983 | Yamamoto et al. | 425/461 |
| 4,384,841 | 5/1983 | Yamamoto et al. | 425/380 |
| 4,465,652 | 8/1984 | Lentz | 264/177.12 |
| 4,668,176 | 5/1987 | Ziebig et al. | 425/464 |
| 4,915,612 | 4/1990 | Gangeme et al. | 425/466 |

FOREIGN PATENT DOCUMENTS

| | | | |
|---|---|---|---|
| 60-129235 | 7/1985 | Japan | 425/466 |
| 61-5915 | 1/1986 | Japan | 47/92 |
| 2172840A | 10/1986 | United Kingdom | 425/466 |

*Primary Examiner*—Jeffery Thurlow
*Attorney, Agent, or Firm*—Burton R. Turner; Richard N. Wardell

[57] ABSTRACT

Novel method and apparatus is disclosed for forming an integral skin on an extruded honeycomb structure, wherein the skin material is collected in a peripheral area of a die body, is passed through an adjustable flow control gap, and then through a predetermined gap thickness of a skin forming slot so as to then knit with the honeycomb structure extruded by the die prior to being extruded from the die. A plurality of flow control plates having different internal peripheral diameters are provided so as to provide different flow control gaps, as desired. In addition, a plurality of shims having different thicknesses are provided so as to position the mask a given distance away from the die, and thereby control the skin thickness gap. The die may be formed by merely relieving a peripheral portion of a typically automotive catalytic converter extrusion die and providing a trim ring about the relieved portion so as to inhibit the flow of batch material from partially open feed holes.

17 Claims, 1 Drawing Sheet

METHOD AND APPARATUS FOR FORMING AN OUTER SKIN ON HONEYCOMB STRUCTURES

BACKGROUND OF THE INVENTION

This invention relates to the art of producing thin-walled honeycomb structures from extrudable material such as particulate ceramic and/or metal batches and similar materials which have the property of being able to flow or plastically deform during extrusion, while being able to become sufficiently rigid immediately thereafter so as to maintain their structural integrity. More particularly, the present invention relates to an improved extrusion die assembly for forming a honeycomb structure with an integral outer peripheral skin by modifying the outer peripheral face of a conventional extrusion die structure and providing flow control and thickness control means for producing the desired skin.

The prior art is replete with extrusion die and mask assemblies of different configurations for providing cellular structures with an outer skin; however, virtually all such assemblies require the use of specific dies and incorporate rather complex assemblies, and do not contemplate the unique concerns of the extrusion die apparatus of the present invention.

U.S. Pat. No. 4,349,329 relates to an extrusion device for producing honeycomb structures wherein a pooling zone is provided with batch material solely from the discharge slots, and such zone then supplies material to form an outer wall and thickened web portions between outer peripheral cells.

U.S. Pat. No. 4,381,912 discloses an extrusion die for forming a honeycomb structure wherein the skin material flows laterally through peripheral discharge slots alone, or through such slots and a gap, to knit with center webs and form a peripheral skin thereon.

U.S. Pat. No. 4,668,176 relates to an extrusion device for the production of honeycomb structures wherein a spring element controls the thickness of a passageway for the flow of skin material, and accordingly the thickness of the resulting skin, and a pivotal plate controls the flow of such skin material to such passageway.

Japanese Unexamined Patent Application, Publication 61-5915 relates to an extrusion die for forming honeycomb shaped material, wherein the rate of extrusion of the material adjacent the skin is controlled by the use of shorter rate-adjustment pins so as to match the rate of extrusion at the center of the die.

Conventional skin-forming processes of the prior art generally depended upon the wet, newly-formed substrate just emerging from the die to act as one of the forming surfaces to assist in creating an exterior skin. The second forming surface was usually a mask, contoured to the ultimate desired shape of the substrate. However, the skin extruded with such a process optimally formed at a thickness near or equal to the thickness of the internal webs of the substrate, and most attempts aimed at increasing the skin thickness resulted in the collapse of one or more rows of cells in the peripheral area of the webs.

In order to overcome the problems and complexities with the above-noted die assemblies of the prior art, it is an object of the present invention to provide an extrusion die assembly for forming thin-walled cellular substrates with an integral outer skin of greater thickness than the webs of the substrate so as to improve both wet strength and the structural integrity of the fired structure.

SUMMARY OF THE INVENTION

In its simplest form, the present invention sets forth a simplified concept in extrusion die and mask assemblies for forming honeycomb structures with an integral skin formed thereon. An outer peripheral portion of the outlet face of a conventional die may be relieved or cut away down to the feed holes, or alternatively a die may be initially formed with such relieved portion, and flow control and skin thickness means are provided in the relieved area for forming the desired integral skin about an extruded honeycomb structure formed by the die. A trim ring is provided on an outer peripheral cylindrical surface of the relieved die body so as to close off the longitudinal extent of any peripheral feed holes which were intercepted by the relieving process. A flow control plate having an inner peripheral opening of desired dimensions or diameter, is positioned upon the relieved surface which intersects the cut-away peripheral feed holes, add not only provides a flow control gap between its inner periphery and an outer periphery of the trim ring, but also forms a reservoir with the trim ring, upstream of the flow control gap, in communication with a plurality of the peripheral feed holes. A skin former or mask is positioned a given distance from the flow control plate by a shim of given thickness so as to produce a desired skin gap thickness between the skin former and the complementary surface formed by the modified die and the trim ring.

While the method and die of the present invention can be used to make honeycomb or cellular structures with a variety of dimensions, they are especially useful in making thin walled products having transverse open frontal areas greater than 75%, provided with a comparatively thick skin relative to the thin walls.

DESCRIPTION OF THE PREFERRED EMBODIMENTS

Figure 1:
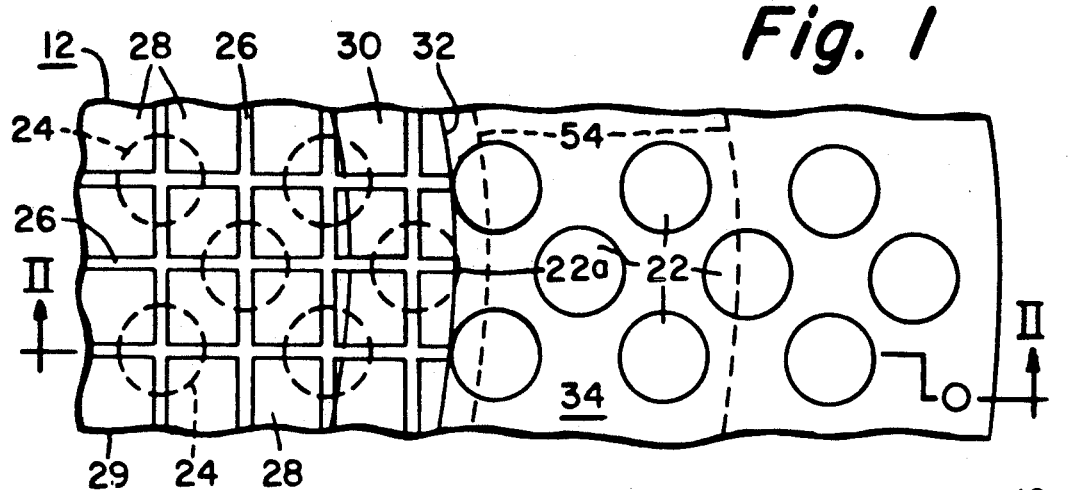
FIG. 1 is a fragmental plan view of a relieved or modified die utilized in the present invention.

Referring now to the drawings, a preferred embodiment of the extrusion die assembly of the present invention is shown at 10 comprising a relieved die body 12, a trim ring 14, a flow control plate 16, a skin former or mask 18, and a shim 20. The die body 12 may be a typical automotive catalytic converter type extrusion die having peripheral feed holes 22, central feed holes 24 communicating at one end with an inlet face and at the other with a plurality of interconnected discharge slots 26 forming pins 28 therebetween in an outlet face 29, which die has been modified in its peripheral area by the removal of the peripheral pins and a portion of the peripheral feed holes 22. The machining operations producing the relieved die result in the formation of a tapered or frusto-conical surface 30, a peripheral cylindrical surface 32 which lies substantially concentric with the longitudinal axis A of the die body, and an annular planar surface 34 extending transversely of axis A and intersecting the peripheral feed holes 22.

Figure 2:
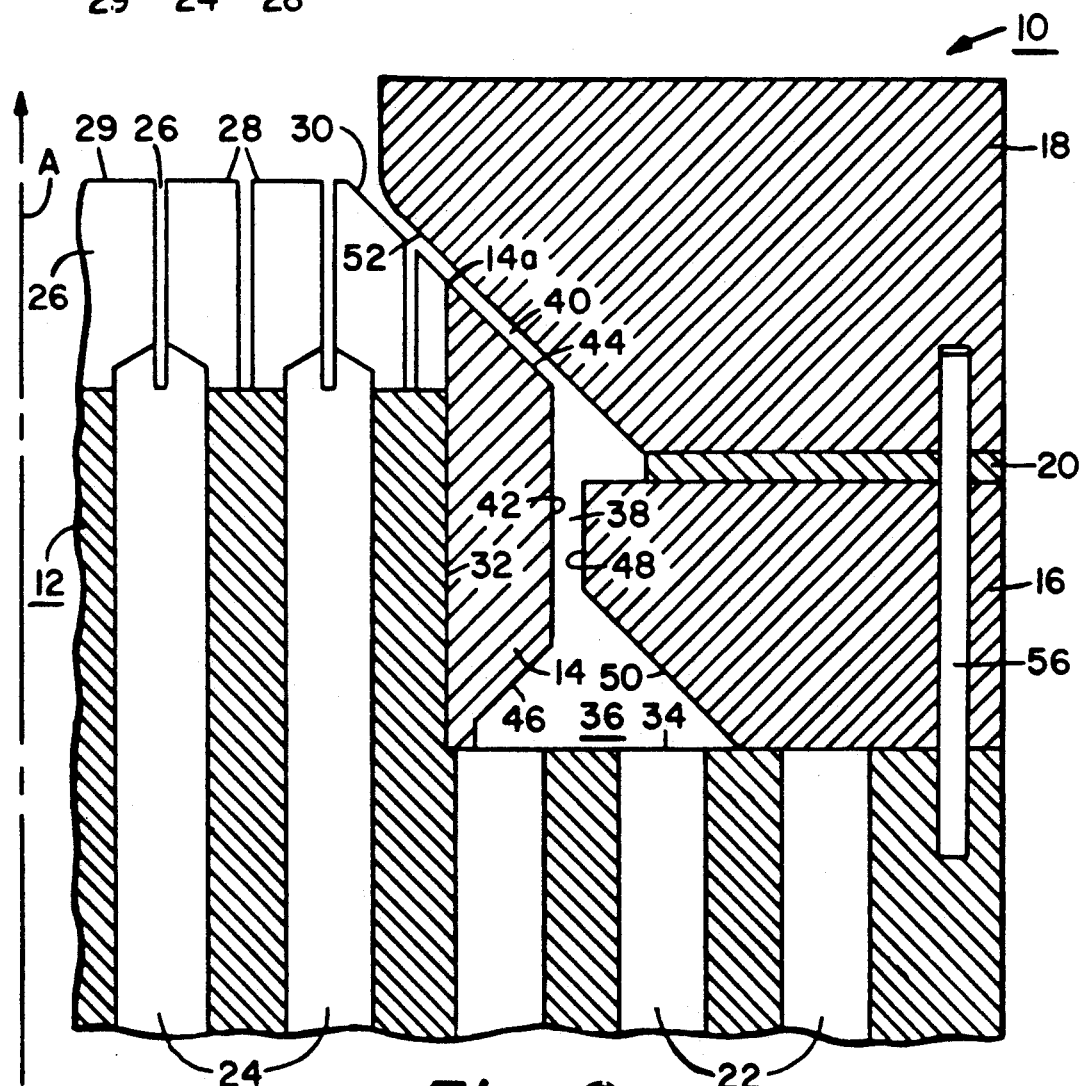
FIG. 2 is a fragmental sectional view in elevation of an extrusion die assembly of the present invention which would be seen when the die is cut along line II—II of FIG. 1.

As shown in FIG. 2, a batch reservoir 36 is formed between relieved portions of the trim ring 14 and the flow control plate 16 adjacent planar surface 34, an adjustable flow control gap 38 is provided between complementary surfaces of the trim ring 14 and flow control plate 16, and a skin forming slot or gap 40, determining the thickness of the skin, is formed between complementary surfaces of the die 12 and trim ring 14 with the skin former 18. However, as noted in FIG. 1, the machining operation modifying the peripheral area of the die body 12, exposes partial holes 22a around the die communicating with the cylindrical vertical surface 32. In view of the fact that such partial holes 22a could provide unwanted flow passages which would circumvent the desired flow control gap 38, the trim ring 14 is installed about the peripheral cylindrical surface 32 of die body 12, and seals off such partial holes.

The trim ring 14 is a cylindrical member, preferably of a hardenable material, shrunk fit or otherwise held in place as by welding or soldering onto the die 12 about the peripheral cylindrical surface 32. The point 14a of the trim ring 14 must be outwardly of the outer extent of the feed holes 24 to provide a complete separation between the feed holes 24 adjacent cylindrical surface 32, and insure a complete blocking off of any possible batch flow from the partial feed holes 22a into the skin forming gap 40.

The trim ring 14 is machined to its final dimensions after the ring is installed in place on the die 12 to insure proper concentricity of the fixed peripheral face 42, forming one side of the flow control gap 38, with the center line or longitudinal axis A of the die body 12. Such post-installation machining also guarantees a uniform smoothness and contiguous extension of the tapered or frusto-conical surface 30 of the die 12 and the tapered, frusto-conical surface 44 of the ring, which together comprise a contiguous skin forming surface on one side of the skin forming gap 40. Further, an inner portion 46 of the trim ring is configured to form one side of the reservoir 36.

The key role of the flow control plate 16 is to form the opposite face 48 of the flow control gap 38, which meters the flow of batch material into the outer skin-forming slot 40. The dimension of the inner peripheral face 48 of the flow control plate 16 can be varied in a succession of flow control plates 16 to provide a range of adjustment possibilities for the adjustable flow control gap 38, by merely substituting one removable flow control plate 16 for another of a different inner peripheral diameter. An upstream or inner surface 50 of the flow control plate 16 forms an opposite side from surface 46 of the batch reservoir 36. Although not a preferred embodiment due to residual memory in the batch, if desired, the flow control gap 38 could be in the form of a circular ring of closely spaced metering holes formed through plate 16.

The skin former 18 is analogous to a traditional mask, and has a tapered or frusto-conical surface 52 which forms the outer confining surface of the skin forming slot 40, while the contiguous tapered or frusto-conical surface portions 30 of the die and 44 of the trim ring form the inner confining surface of the skin forming slot or gap 40. Upon extrusion of a honeycomb structure through the die 12, the internal webs formed by the interconnected discharge slots 26 begin to knit with the skin formed in the skin forming slot 40 at the outer most point 14a of the ring 14, and the internal webs continue to knit with the skin between point 14a and the exit from the die.

The thickness of the shim 20 determines the width of the skin forming gap 40. In other words, a variety of shims, of variable thickness, may be provided as desired, to adjust the thickness of the skin forming gap 40. In essence, the volume of flow is controlled by the adjustable flow control gap 38 upstream of the skin forming gap 40, whereas the skin thickness, per se, is determined by the thickness of the shim 20 utilized in the die assembly. Both elements of flow control and skin thickness must work cooperatively to achieve the delicate balance between proper volumetric metering of batch, and skin thickness and velocity. The batch which ultimately will become skin, enters the die through peripheral feed holes 22 and is collected in the reservoir 36, and is first subjected to shaping influences and pressures in the flow control zone 38 between the trim ring 14 and the flow control plate 16. This pressure is sustained as the now roughly configured sheet of skin enters the skin forming slot or gap 40 between the mask 18 and die 12, and traverses the increasingly smaller annular space within such gap. The pressure within the skin forming slot 40, acting against the pressure within the die slots 26, is necessary for the success of the all-important web-to-skin knitting function which proceeds between point 14a and the exit of the material from slot 40 at outlet face 29.

The reservoir 36 is designed in order to furnish a reservoir into which batch may flow in great abundance. In view of the fact that the feed holes 22 below the reservoir 36 are much shorter than the central feed holes 24, the impedance in the peripheral feed holes 22 is appreciably less, and thus an abundant delivery is assured to the reservoir. The width of the reservoir intersecting planar surface 34 of die 12 should span at least 2½ to 3 feed hole centers, as shown by the phantom lines 54 in FIG. 1, in order to dampen out the discrete flow effects from single feed holes.

A plurality of slip-fit dowels 56 may be utilized to align the skin former, the adjustable thickness shim and the removeable gap flow control plate with the die body 12, to form the extrusion die assembly of the present invention. Further, although it is preferred that the confining walls 52 and 30,44 of the skin forming slot 40 be parallel, if desired such surfaces may be slightly tapered toward one another as they extend outwardly of the die so as to produce increased shearing effects.

Although the now preferred embodiments of the invention have been disclosed, it will be apparent to those skilled in the art that various changes and modifications may be made thereto without departing from the spirit and scope of the invention as set forth in the appended claims.

I claim:

1. A method for forming an outer skin on a honeycomb structure which comprises:
   extruding batch material longitudinally through a central portion of a die body for forming a honeycomb structure having web portions;
   flowing a portion of said batch material longitudinally through peripheral feed hole portions of said die body;
   directly collecting such peripherally flowing batch material within a reservoir;
   initially controlling the volume of flow of batch material from said reservoir through an adjustable flow control gap;

providing a skin forming slot with a desired skin forming gap thickness;

flowing said batch material from said adjustable flow control gap through said skin forming slot having the desired gap thickness;

and while flowing such batch material within said skin forming slot, initially engaging web portions of said honeycomb structure, and knitting said skin forming batch material with said web portions while still within said slot for providing a honeycomb structure with an integral outer skin thereon.

2. A method for forming an outer skin on a honeycomb structure as defined in claim 1 including the step of flowing said portion of batch material through peripheral feed holes formed in said die body and directly collecting such batch material from said feed holes within said reservoir.

3. A method of forming an outer skin on a honeycomb structure as defined in claim 1 including the step of controlling the volume of flow of batch material from said reservoir by providing a succession of flow control members having differing peripheral dimensions for providing a different flow control gap as desired.

4. A method of forming an outer skin on a honeycomb structure as defined in claim 1 wherein said batch material extruded longitudinally through a central portion of said die body is prevented from contacting said skin forming material within said slot until after said web portions are formed in the die body.

5. A method of forming an outer skin on a honeycomb structure which comprises:

providing a die body having a plurality of feed holes communicating with a plurality of interconnected discharge slots formed in an outlet face of the die body and forming a plurality of pins therebetween;

forming a relieved peripheral portion on said die body with no pins in such peripheral portion and with shortened feed holes with such peripheral portion, so as to provide a frusto-conical surface communicating with the outlet face of the die, a cylindrical surface concentric with the longitudinal axis of said die body, and an annular planar surface extending transversely of said longitudinal axis;

providing flow control elements within said relieved portion of said die body for forming a peripheral batch reservoir adjacent an outlet end of said shortened feed holes and an adjustable flow control gap downstream of said batch reservoir;

providing means for forming a skin forming slot in said relieved area, downstream of said flow control gap, and with an adjustable desired gap thickness;

flowing batch material through a central portion of said die body for forming a honeycomb structure having web portions;

flowing batch material through peripheral portions of said die body, collecting the same in said reservoir, controlling the volume of flow of such material from said reservoir through said flow control gap, and flowing such material from the flow control gap through said skin forming slot having the desired skin thickness; and knitting the web portions of said honeycomb structure with the skin forming material while still within said skin forming slot.

6. A method of forming an integral outer skin on a honeycomb structure as defined in claim 5 including the step of forming a ring means about said cylindrical surface to close off any feed holes communicating with such surface.

7. A method of forming an integral outer skin on a honeycomb structure as defined in claim 5 including the step of providing a first flow control element having a fixed peripheral surface of a given diameter and a plurality of second flow control elements having a variety of complementary peripheral surfaces of differing diameters, and substituting different ones of said second flow control elements so as to provide the desired flow control gap between said complementary peripheral surfaces.

8. Apparatus for forming a honeycomb structure with an integral outer skin thereon which comprises:

a die body having an inlet face and an outlet face;

said die body having a frusto-conical surface communicating about the peripheral extent of said outlet face, a peripheral cylindrical surface concentric with the longitudinal axis of said die body and communicating with said frusto-conical surface, and an annular planar surface communicating with said cylindrical surface and extending transversely of said longitudinal axis;

a plurality of peripheral feed holes communicating between said inlet face and said annular planar surface;

ring means forming on said die body about said cylindrical surface for inhibiting the flow of batch material from any feed holes open to said cylindrical surface and having a surface portion contiguous with and extending said frusto-conical surface or said die body;

removable flow control means having an inner peripheral surface concentric with an outer peripheral surface of said ring means and spaced a given desired distance therefrom to provide a flow control gap therebetween;

skin forming means having a frusto-conical surface positioned a given distance from said extended contiguous frusto-conical surfaces so as to form a skin forming slot therebetween; and means for adjustably positioning the frusto-conical surface of said skin former means from said contiguous frusto-conical surfaces so as to provide a desired skin gap thickness.

9. Apparatus for forming a honeycomb structure with an intergral outer skin as defined in claim 8 including batch reservoir means formed between portions of said ring means and said flow control means adjacent said planar surface and in communication with a plurality of said peripheral feed holes.

10. Apparatus for forming a honeycomb structure with an integral outer skin as defined in claim 8 including a plurality of interconnected discharge slots formed in the outlet face of said die body, a plurality of central feed holes communicating with said inlet face and terminating with said discharge slots, and said ring means having a surface terminating at said skin forming slot inwardly of said outlet face but outwardly of the termination of said central feed holes.

11. Apparatus for forming a honeycomb structure with an integral outer skin as defined in claim 8 including a succession of flow control means, each having a different inner peripheral diameter, and removably positionable adjacent the outer periphery of said ring means so as to vary the flow control gap as desired.

12. Apparatus for forming a honeycomb structure with an integral outer skin as defined in claim 8 wherein said adjustable positioning means includes shim means of desired thickness positioned between said flow control means and said skin former means.

13. Apparatus for forming a honeycomb structure with an integral outer skin as defined in claim 8 wherein said ring means has an outer peripheral surface with a fixed diameter, and said removable flow control means is positioned on said annular planar surface and has an inner periphery with a variable predetermined diameter so as to define a desired flow control gap between said outer peripheral surface of fixed diameter and said inner periphery of desired diameter.

14. Apparatus for forming a honeycomb structure with an integral outer skin as defined in claim 13, wherein a reservoir for batch material flowing from said inlet face is formed between said ring means and said flow control means adjacent said annular planar surface, such that flow of batch material from said reservoir is directed through said flow control gap.

15. Apparatus for forming a honeycomb structure with an integral outer skin as defined in claim 13, wherein said adjustable positioning means is in the form of a shim member of desired thickness positioned upon said flow control means, said skin former means is positioned upon said shim member, and the thickness of said shim member determines the gap thickness of said skin forming slot formed between said skin former means and frusto-conical contiguous surfaces of said die body and said ring means.

16. Apparatus for forming a honeycomb structure with an integral outer skin as defined in claim 15, wherein said skin former means, said shim member, and said flow control means are all maintained in position with respect to said die body by means of press-fit dowels.

17. Apparatus for forming a honeycomb structure with an integral outer skin as defined in claim 14, wherein a plurality of central feed holes communicate with interconnected discharge slots formed in said outlet face, and a plurality of much shorter peripheral feed holes communicate with said reservoir.

* * * * *

UNITED STATES PATENT AND TRADEMARK OFFICE
CERTIFICATE OF CORRECTION

PATENT NO. : 5,089,203

DATED : February 18, 1992

INVENTOR(S) : Harry A. Kragle

It is certified that error appears in the above-identified patent and that said Letters Patent is hereby corrected as shown below:

PATENT

Col. 2, line 22 "add"
should be "and"

Col. 5, line 39 "with"
should be "within"

Signed and Sealed this

First Day of June, 1993

Attest:

MICHAEL K. KIRK

*Attesting Officer*     *Acting Commissioner of Patents and Trademarks*